June 11, 1957   J. W. BATES   2,795,173
APPARATUS FOR CLOSE-UP STEREOGRAPHY OF IMMOVABLE OBJECTS
Filed Oct. 19, 1953   2 Sheets-Sheet 2
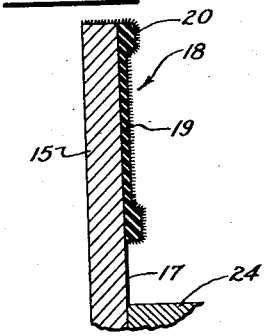
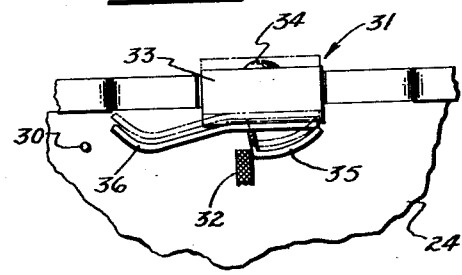
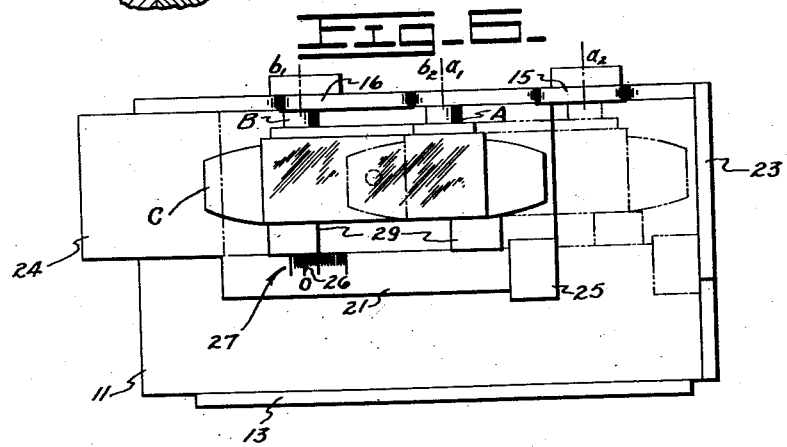
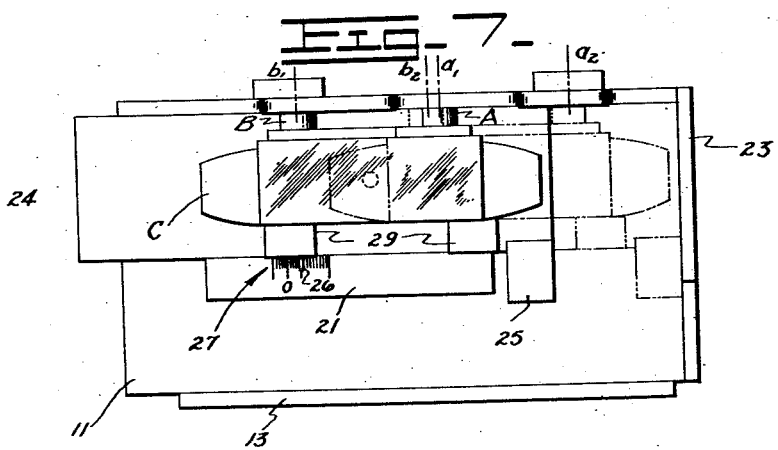
INVENTOR
JACKSON W. BATES
BY
Laurence Vanderkler & Miller
ATTORNEYS United States Patent Office 2,795,173
Patented June 11, 1957

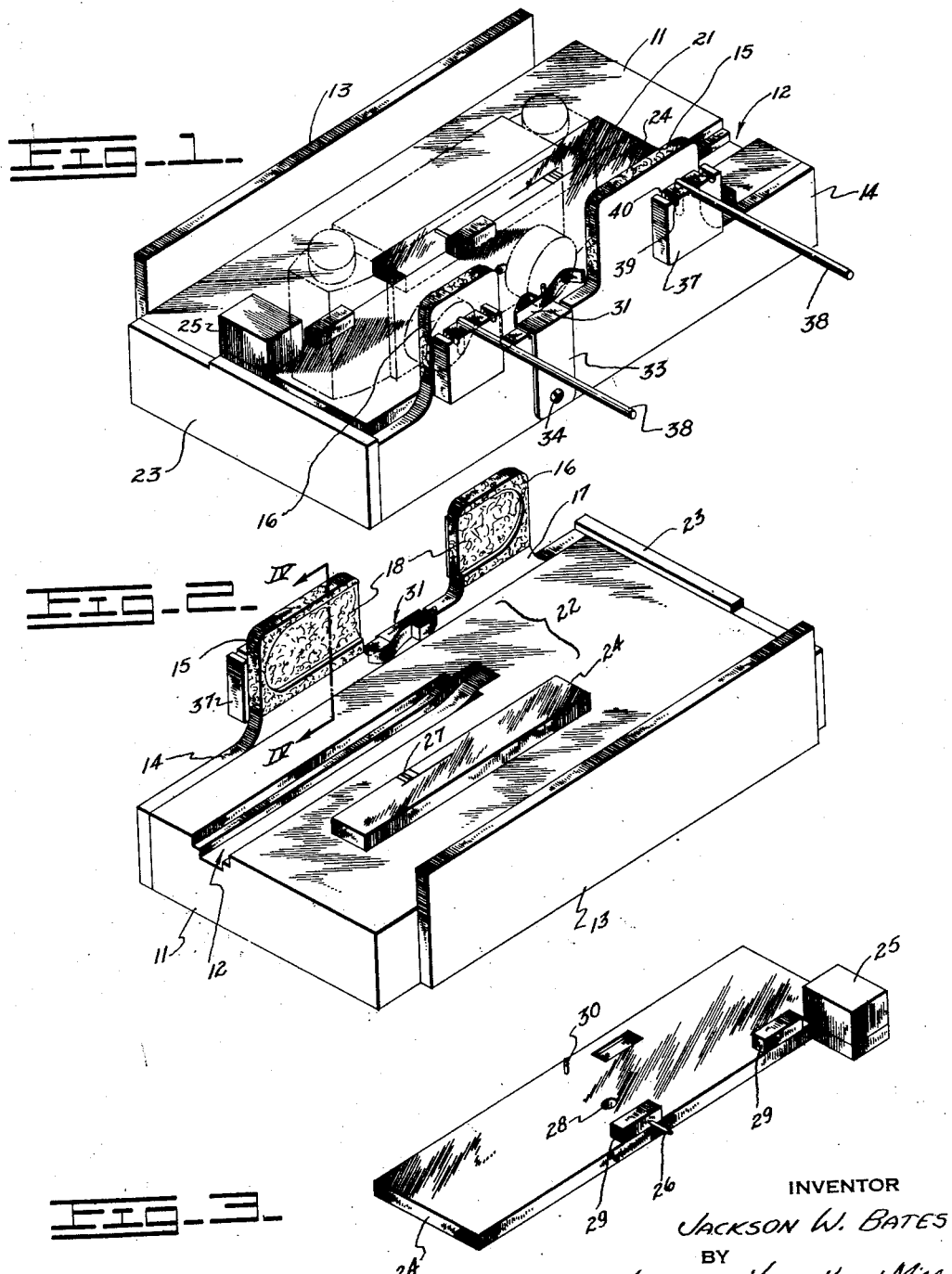

2,795,173

APPARATUS FOR CLOSE-UP STEREOGRAPHY OF IMMOVABLE OBJECTS

Jackson W. Bates, Ovid, Mich.

Application October 19, 1953, Serial No. 386,840

5 Claims. (Cl. 95—18)

The present invention is an apparatus for close-up stereography of immovable objects and more particularly a structure permitting the adjustment of the distance between lens centers in stereoscopic cameras having a fixed interocular distance.

In stereoscopic cameras the interocular distance (distance between lens centers) approximates the distance between the human eyes. In this manner, depth or perspective is given to the combined image photographs taken with such a difference in lens position. The photographic or stereographic result closely approximates the reaction of the eyes to visual experiences. Frequently it is desirable to use the stereoscopic camera for taking close-up photographs of immovable objects. In such cases the normal interocular distance is too great and the stereoscopic effect is distorted as is the image of any object as it is brought within ten or twelve inches of the human eyes. However, if the interocular distance in the camera or in the human eyes could be decreased, it would be possible, aside from focus, to achieve the same depth in stereoscopic effect as is normally obtained at greater ranges. It is impossible to adjust the interocular distance in human beings. In adjusting the interocular distance between camera lens centers the practical barriers which arise result from the lens size itself and the space requirements of optical components behind lenses which cannot be overlapped.

Apparatus presently exists for accomplishing close-up stereography using a single lens camera and displacing the distance between exposures so as to adjust the interocular distance. The film must be moved, the shutter recocked, and the resulting photographs must be indexed for mounting after the photograph is taken.

Stereoscopic cameras for long-range stereographic photography have been developed wherein two lenses are fixedly spaced a distance from each other and wherein the shutters of both lenses are activated simultaneously. The film in such cameras is automatically indexed for proper mounting in standard viewing frames after the photographs have been taken. The reality and lack of distortion accomplished by stereography have materially broadened the horizons in research involving mapping, aerial photography, and pure photographic art. Equally broad ranges of stereographic usefulness occur in close-up stereography. In dental studies, in surgical photography, in scientific reproduction work, in metallurgy, bacteriology and pathology, the importance of providing the reality ranges possible in stereographic photography render close-up stereography an important new field. In pure photographic art, the extreme reality achieved under close-up conditions upon immovable objects has proved the usefulness of stereography in close-up work.

This invention is calculated to permit exploration and close-up stereography by persons presently equipped with twin lens stereoscopic cameras and to provide the advantages of using a twin lens camera having a fixed interocular distance in close-up work.

The present invention provides an apparatus permitting close ups by variation in the interocular distance in twin lens stereoscopic cameras having simultaneous shutter activating means. The invention more particularly provides a camera mounting for standard stereoscopic cameras which permits a simplification of close-up stereo work in accurate adjustment.

One of the objects of this invention is to provide a suitable stereo camera mount permitting calibrated adjustment of the interocular distance.

Another object of this invention is to provide a camera mounting for twin lens cameras which permits the use of simultaneous shutters, yet permits the taking of one exposure per lens without requiring that the film be turned or other adjustments be made.

Another object is to provide means for rapidly accomplishing the taking of two separate exposures at varying interocular distances by the use of a twin lens camera so that the object photographed has no opportunity to move and distort.

Another object is to provide a structure to accomplish adjustment of interocular distance which is simple to manufacture, easy to use, and of great portability.

Other objects of this invention will occur to those familiar with stereoscopic cameras and problems as the description proceeds.

In the drawings:

Figure 1 is a perspective front view of the close-up apparatus showing a twin lens camera with a fixed interocular distance in phantom line mounted upon the apparatus.

Figure 2 is a perspective rear view of the close-up apparatus base portion with the slide plate and camera removed therefrom.

Figure 3 is a perspective rear view of the slide plate with the camera dismounted therefrom.

Figure 4 is a partial side elevation in cross section of the lens cover taken along line IV—IV of Fig. 2.

Figure 5 is a detail showing the latch cocking structure and a partial plan view of the slide plate which indicates in phantom lines the operation of said latch cocking structure.

Figure 6 is a plan view schematic diagram indicating the setting of the apparatus so that the displacement between lens centers is zero and showing the fully shifted position of the camera in phantom lines.

Figure 7 is a plan view schematic diagram indicating the setting of the apparatus so as to achieve a calibrated displacement between lenses less than the fixed interocular distance and showing the fully shifted position of the camera in phantom lines.

*General description*

In general the apparatus for close-up stereography of immovable objects consists of a rectangular base in which a guideway is established. In the guideway a slide plate is shiftably positioned and its travel limited at one end by engaging an end plate transversely blocking the path of the slide plate. The opposite travel of the slide plate is halted by a stop lug engaging a guide plate at a predetermined point. The slide plate is adapted for the mounting of a standard two lens stereoscopic camera. The camera is mounted on the slide plate so that when the slide plate and attached camera are shifted to engage the transverse end plate the lens nearest the end plate is shrouded behind a cushioned lens cover built into an abutment which rises along the front side of the base. Another lens cover of like height and aligned to intersect the lens axis is spaced apart from the first mentioned cover and similarly is built into the abutment.

Facing the mounted camera the abutments also serve to hang feeler type range finders which parallel the lens axes and extend outward to define a field and to precisely indicate the desired distance between lens and object, A spring-actuated latch is mounted between the lens cover abutments and extends over into the guideway. As the slide is moved the mounted camera passes the latch and the shutter cocking lever is engaged by the latch and both lenses of the camera are cocked.

A scale in convenient linear measure is provided running parallel to and along the edge of the guideway. An indexing point is provided on the slide which locates itself in the "zero" position on the scale when the slide has been shifted so that the stop lug is in engagement with the guide plate.

The camera having been shifted past the cocking latch, both lenses are prepared to be simultaneously activated. With the camera thus cocked and with the slide plate stop lug engaging the guide plate, one of the camera lenses is covered by one of the lens shrouds and the lens mounted nearest the transverse end plate is clear of obstruction. The shutter is released and one image is formed by the field exposed to the unobstructed lens. The lens shutter on the obstructed lens was also opened but by reason of the obstruction no image was formed thereby.

The camera can now be shifted by moving the slide plate until its movement is halted by engaging the transverse barrier across the guideway. This positions the lens, previously shrouded, in an unobstructed position between the lens abutments and in precisely the same position as the first lens. The shutter is cocked because the latch has engaged the shutter cocking lever as the camera moved by. The shutter is released and a second image is registered by the second unobstructed lens while the first lens used is shrouded by the lens shroud upon the abutment nearest the transverse barrier across the guideway.

Thus, separately, each lens is positioned in identically the same position and although each time the simultaneous shutter is released both lens are opened, only one image is registered upon the film in the camera and that image by the lens unobstructed by either of the lens shrouds or covers.

Stereographic effects are dependent upon some displacement between lenses. The movements referred to above simply indicate how identical images may be registered and illustrate what occurs when the camera is shifted by means of the slide plate first to one extreme of its travel and then to the other. A lineally calibrated scale is provided to accurately indicate directly the amount of displacement desired. By setting the indexing point upon the slide opposite the desired amount of displacement, releasing the shutter, shifting the camera full over against the transverse end plate, and releasing the cocked shutter a second time, the desired interocular distance is imparted between lens positions when the individual photographs are registered.

The desired interocular settings will vary depending upon the particular close-up lens attached to the camera and the desired distance from lens to object. A more detailed description of this matter will be found in the portion of this specification titled "Operation."

*Specific description*

In the following description "front" shall have reference to the side of the apparatus having spaced lens abutments and "back" shall have reference to the side of the apparatus having a vertically rising light mounting panel as oriented in Fig. 1.

A base 11 generally rectangular in shape and adapted for flat table top mounting or tripod mounting is provided. A slot 12 is longitudinally positioned in the top of the base 11. A light mount or panel 13 is attached to the back side of the base 11 and consists of a single plate to which can be mounted illuminating lamps and the like. An abutment 14 is fastened to the front side of the base 11 and rises a short distance above the top of the base 11. A part of this abutment 14 are two lens shrouds or covers 15 and 16 which are extensions above the short rise 17 above the top of the base 11. The lens shrouds 15 and 16 are slotted to form pockets 18 (as shown best in Fig. 4) therein aligned with the height of the lenses on any particular camera C. The shroud pockets 18 are lined with a thin layer of resilient material 19 such as sponge rubber and the lens shrouds 15 and 16 are then padded or covered by a layer of light screening fabric 20 such as velvet, as best illustrated in Fig. 4.

A guide plate 21 is attached to the base 11 and its inner edge parallels the abutment 14. Thus the abutment 14 and guide plate 21 establish a guideway 22 in top of the base 11. At one end of the base 11 a transverse barrier or end plate 23 serves to stop the movement of a rectangular slide plate 24 by engagement therewith. Extending from the rear of the slide plate 24 is a stop lug 25 arranged to halt the movement of the slide plate 24 in a predetermined position such that the index arm 26 upon the slide plate 24 registers upon the "zero" reading of the calibrated scale 27 upon the guide plate 21. This is accomplished by the stop lug 25 engaging the guide plate 21 upon shifting of the slide plate 24 in an opposite direction from its engagement with the transverse barrier 23.

The slide plate 24 is provided with a hole 28 and positioning blocks 29 for mounting a two lens stereoscopic camera C thereupon. When the slide plate 24 is positioned in the guideway 22 the slot 12 permits clearance for the tripod screw (not shown) so that the mounting of the camera C does not interfere with the movement of the slide plate 24 upon the base 11. The blocks 29 have their inner faces aligned parallel to the guideway 22. The blocks 29 are arranged to engage the back of the camera C so that with a tripod mounting screw (not shown) inserted through the slide plate 24 the camera is rigidly but removably fixed to the slide plate. The position of the hole 28 in the slide plate 24 may be variously positioned to accommodate the various styles of camera adaptable to this mounting. The particular position indicated in Fig. 3 is illustrative of only one position. It is also understood that a slide plate may be provided having adjustments in lieu of a single hole 28 so as to adapt the apparatus to various styles of camera. A latch pin 30 is also provided in a predetermined position on the top of the slide plate 24 so that it extends upwardly therefrom as shown in Fig. 3. The purpose of the latch pin 30 will be more fully revealed as the description proceeds.

Upon the abutment 14 a spring-loaded cocking latch 31 extends into the guideway 22 in such a position as to engage the cocking lever 32 of the camera C and the latch pin 30. Fig. 5 best illustrates the operation of the cocking latch 31. The latch spring 33 extends downward along the front face of the abutment 14 and is attached to the face of the abutment 14 by means of latch spring screw 34. A portion of the latch 31 which extends into the guideway so as to clear the slide plate 24 is cam-like 35 and arranged to move the shutter cocking lever 32 a predetermined distance as the slide plate is moved past the latch 31 and then as the latch pin 30 engages the latch guide 36 the whole latch 31 is moved outwardly from engagement with the cocking lever 32 by reason of the spring portion 33 permitting resilient movement thereof. It will be seen that the latch 31 cocks the camera C only when the slide plate 24 and mounted camera C is moved in a direction toward the transverse end barrier 23. The particular latch indicated in the drawing is positioned for a particular style of camera C where the cocking lever 32 is positioned at the front and near the base of the camera C midway between the twin lenses. It will be understood that a repositioning of the latch can be made to adapt the location of the latch to any two lens stereographic camera without a departure from this invention.

On the front sides of the lens shrouds 15 and 16 opposite the lens engaging portion are provided holders 37 into which "feeler" range finders 38 may be removably inserted. Notches 39 at right angles to the plane of the abutments 14 assure that the "feeler" range finders 38 will extend perpendicularly from the lens shrouds 15 and 16. The range finders 38 are in pairs of various lengths to precisely indicate standard distances from the lens to object, and the apertures 40 into which the range finders 38 may be inserted are varied horizontally by providing several apertures 40 in the holders 37 into which the range finders 38 may be positioned so as to define the width of field to be photographed. The range finders 38 are prepared having in mind the particular close-up lenses which will be used and their range limitations.

The material employed for the fabrication of this apparatus, except where otherwise indicated, may be metal, wood, plastic, or combinations of these materials and may be dimensioned or rendered adjustable so as to accommodate the mounting of a number of styles of stereoscopic cameras without a departures from the invention herein described.

Operation

In order to operate the apparatus a camera C, having two lenses A and B with a fixed interocular distance and equipped with synchronized shutters is mounted upon the slide plate 24 by means of a tripod socket screw (not shown) extending upward through the slide plate 24 and positioned in such a manner that the lenses A and B with close-up auxiliaries as desired slidably shroud themselves in the cushioned shrouds 15 and 16, as the slide plate 24 is reciprocated in the guideway 22.

The auxiliary close-up lenses are selected and attached to the camera C in consideration of the desired distance from the lens to the object to be photographed. Range finders 38 are inserted in the holders 37 and positioned so as to precisely indicate the distance desired between lenses and object. This also defines the width of the field which is covered by the lenses. If desirable appropriate lighting apparatus can be attached to the light mount 13 and focused as desired upon the objective area.

From the range (and in consideration of the lenses to be used) it is possible to determine the proper spacing between lenses (interocular distance) to yield a satisfactory stereographic effect. In general, at 4½ inches in front of a +6 diopter auxiliary lens and with the camera lenses A and B focused at 2 feet an interocular distance of one millimeter is found satisfactory. With the camera lenses A and B in the infinity setting the same lens is in focus at 7 inches and a displacement between lenses for stereographic effect of 2 millimeters is desirable.

If a +4 diopter auxiliary lens is used the minimum range is 7 inches and for proper stereographic effect with this lens at the indicated distance a 2 millimeter interocular distance is desirable. With the camera lens at infinity setting the maximum range of this lens is 12 inches and a 4 millimeter displacement between lenses is desirable.

The camera C having been loaded with film and the lenses selected for the appropriate range corresponding range feelers 38 are selected and positioned to define the field so that the object is properly positioned. It is then necessary to achieve the displacement between lens centers in order to procure stereographic results.

The camera C, with its lenses and auxiliaries A and B is mounted on the slide plate 24 in the guideway 22 and the slide plate 24 is fully reciprocated in guideway 22. The slide plate 24 with its indexing arm 26 is returned so that the indexing arm 26 is in the "zero" position opposite the calibrated scale 27. The full reciprocation of the slide 24 with the camera C accomplishes the cocking of the shutters in the camera by reason of the cocking lever 32 being moved into the cocked position upon engagement with the latch 31.

If the shutters were released the lens A would register upon the film a view from position $a_1$ in Fig. 6. The lens B, being obscured, would register no image upon the film in its position at $b_1$. If the slide plate 24 and the camera C is shifted to the extreme position against the transverse barrier 23 the lens B will occupy position $b_2$ unobstructed by any lens shroud and in identically the same position $a_1$, formerly occupied by lens A. Lens A now occupies position $a_2$ behind the lens shroud 16 and by reason of the shift of the slide plate 24 and camera C the camera is again cocked and the film has not been moved in the camera C. The shutters are released and lens B registers the identical image upon the film as was registered upon the film by lens A by reason of the fact that it is in precisely the former position of lens A. No stereographic effect is thereby achieved and the example is illustrative merely of the "zero" positioning of the apparatus so as to better explain the displacement between lenses as shown best in Fig. 7.

In Fig. 7 the camera C and slide plate 24 have been reciprocated so that the shutters are cocked. The object is assumed to be placed 12 inches in front of the lens and a +4 diopter auxiliary lens is being used. A displacement of 4 millimeters between lens positions is desirable. The index arm 26 is set at 4 millimeters read directly from the calibrated scale 27. Lens B is 4 millimeters over from its "zero" position but still shrouded by the lens shroud 15. Lens A is in position $a_1$ (Fig. 7) millimeters over from its position with the "zero" setting and unobstructed. The shutter is released and lens A registers an image from position $a_1$. The lens B in position $b_1$, registers no image because it is shrouded. The slide plate 24 and camera C are shifted fully over against the transverse barrier 23 and the shutters are again cocked by reason of the cocking lever 32 engaging the latch 31. The lens A is now in position $a_2$ and behind the lens cover 16. The lens B is in position $b_2$, 4 millimeters displaced from position $a_1$ of lens A. The shutters are released and lens B, displaced 4 millimeters from the original position of lens A, registers an image upon the film while lens A by reason of its being obstructed registers no image.

In such a rapid manner two images are acquired and the displacement between lenses simply adjusted so as to permit close-up stereography of immovable objects. The film is shifted in the camera C, the slide plate 24 and camera C are fully reciprocated in the guideway 22 and the camera C is prepared for the next set of stereographic images.

Having thus described the invention it will be understood that certain modifications may be made in the apparatus without departing from the spirit of the invention as expressed in the hereinafter appended claims.

I claim:

1. In an apparatus for close-up stereography permitting the adjustment of the interocular distance between fixed lenses in a twin lens stereoscopic camera the combination including: a base having a guideway therein; a slide plate movable in said guideway and adaptable for mounting a twin-lens stereoscopic camera thereon; padded lens shrouds positioned in front of and parallel to said guideway and spaced apart a distance substantially greater than the distance between the fixed lenses of said camera; a transverse barrier across said guideway to limit travel of said slide plate in one direction; a stop lug arranged to index the movement of said slide plate in the opposite direction; and means for directly indicating the desired displacement between lens positions.

2. In a close-up apparatus for twin lens stereoscopic cameras, the combination including: a base member; a guideway established upon said base member; a pair of lens shrouds provided across the face of said base member and spaced apart from each other a distance substantially greater than the distance between the fixed lenses of said camera; a slide plate movable in the said guideway and adapted so that a stereoscopic camera may be adjustably mounted thereon; an indexing mark upon said slide plate; a linear scale upon said base adjacent said guideway; a stop lug upon said slide plate; a guide engaging said stop lug when said index mark is in a predetermined position opposite said scale; a transverse barrier limiting the travel of said slide plate in said guideway when said slide plate is moving in a direction away from engagement of said stop lug with said guide.

3. An apparatus for close-up stereography as in claim 2 including a shutter cocking latch extending into said guideway to engage the cocking lever on said camera mounted upon said slide plate.

4. In a close-up apparatus for twin lens stereoscopic cameras, the combination including: a base member; a guideway established upon said base member; a pair of lens shrouds provided across the face of said base member and spaced apart from each other a distance substantially greater than the distance between the fixed lenses of said camera; a slide plate movable in the said guideway and adapted so that a stereoscopic camera may be adjustably mounted thereon; an indexing mark upon said slide plate; a linear scale upon said base adjacent said guideway; a stop lug upon said slide plate; a guide engaging said stop lug when said index mark is in a predetermined position opposite said scale; a transverse barrier limiting the travel of said slide plate in said guideway when said slide plate is moving in a direction away from engagement of said stop lug with said guide; a shutter cocking latch extending into said guideway; and feeler type range finders adjustably and removably mountable upon the face of said lens shrouds.

5. In a close-up apparatus for twin lens stereoscopic cameras, the combination including: a base member; a guideway established upon said base member; a pair of lens shrouds provided across the face of said base member and spaced apart from each other in such a manner that when one lens of said camera is positioned behind one of said shrouds the other lens of said camera is not positioned behind the other of said shrouds; a slide plate movable in the said guideway and adapted so that a stereoscopic camera may be adjustably mounted thereon; an indexing mark upon said slide plate; a linear scale upon said base adjacent said guideway; a stop lug upon said slide plate; a guide engaging said stop lug when said index mark is in a predetermined position opposite said scale; a transverse barrier limiting the travel of said slide plate in said guideway when said slide plate is moving in a direction away from engagement of said stop lug with said guide; a shutter cocking latch extending into said guideway; and feeler type range finders adjustably and removably mountable upon the face of said lens shrouds.

References Cited in the file of this patent

Book: 3-Dimensional Photography, by McKay, 1951, page 267.